UNITED STATES PATENT OFFICE.

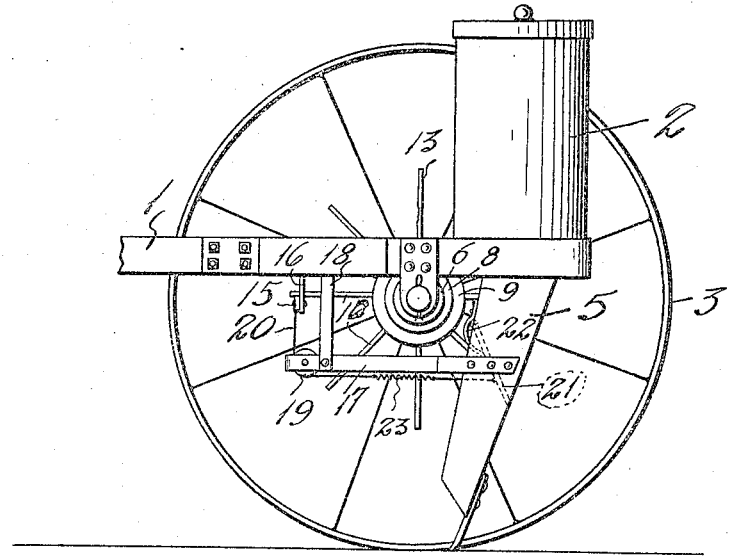
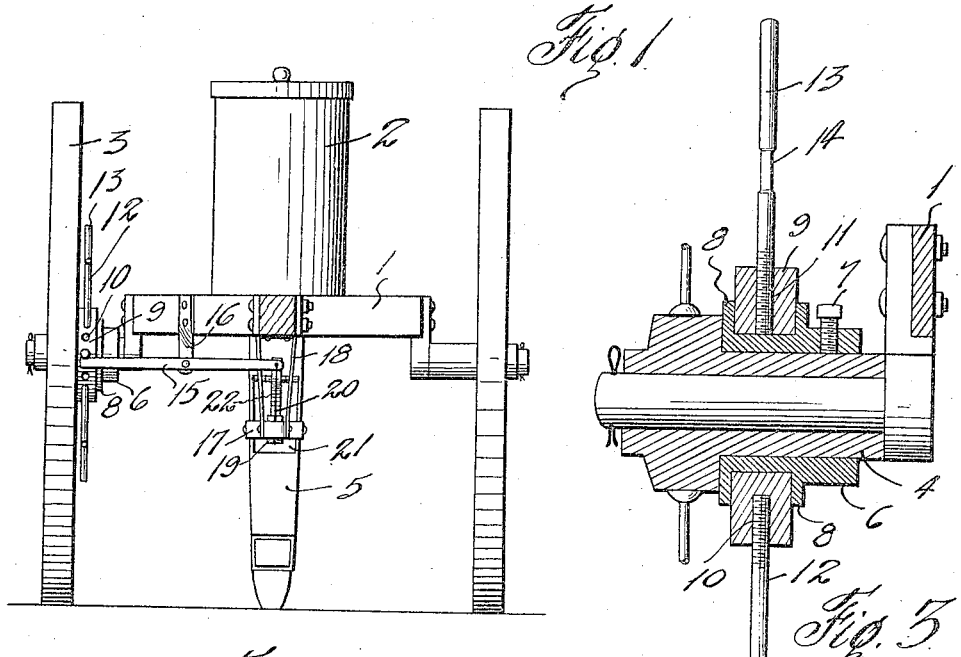

WILLIAM L. SPROWL, OF VAN ALSTYNE, TEXAS.

CHECKING ATTACHMENT FOR PLANTERS.

1,304,916.   Specification of Letters Patent.   Patented May 27, 1919.

Application filed December 28, 1918. Serial No. 268,647.

*To all whom it may concern:*

Be it known that I, WILLIAM L. SPROWL, a citizen of the United States, residing at Van Alstyne, in the county of Grayson and State of Texas, have invented certain new and useful Improvements in Checking Attachments for Planters, of which the following is a specification.

This invention relates to new and useful improvements in checking attachments for planters.

The aim of the invention is to provide a checking attachment which can be applied to the ordinary planter in a very simple and easy manner and whereby the mechanism may be easily adjusted to drop seed at various distances.

In carrying out the invention I provide a sleeve which is adapted to be fastened on the hub or axle of a planter so as to be revolved thereby. A collar is adjustably confined on the sleeve and is provided with a plurality of equally spaced radial recesses and one radial opening extending entirely through the collar spaced in harmony with the recesses. Tripping pins are screw threaded into the recesses and opening. The pin which is inserted in the radial opening of the collar is arranged to bind on the sleeve and thus lock the collar in position thereon. By loosening said pin the collar may be adjusted so as to properly time the tripping operation. It is apparent that by varying the number of pins used the frequency of the tripping is varied and the distance at which seeds are dropped is thus varied. A dropping valve is arranged in the seed chute and a tripping lever having one end in the path of the pins is connected with said valve so as to open the same each time the lever is tripped by the pin.

The invention will be more readily understood from a reading of the following specification and by reference to the accompanying drawings, in which an example of the invention is illustrated, and wherein—

Figure 1 is a side elevation of a planter with the attachment applied thereto, the near wheel being removed, Fig. 2 is a front elevation of the same, and Fig. 3 is a sectional detail of the tripping device.

In the drawings the numeral 1 designates a planter frame on which a seed hopper 2 is mounted and operated in the usual manner. The frame is supported on ground wheels 3 having hubs 4. A seed chute 5 depends from the frame under the hopper and the seed is delivered to the chute in the usual manner. In applying my attachment a sleeve 6 is fastened on the hub 4 by a set screw 7 or in any other suitable manner. The sleeve is disposed on the near side of the wheel and carries a pair of annular flanges 8 between which a collar 9 is snugly confined but free to rotate on the sleeve. This collar is provided with a plurality of radial recesses or pockets 10 and a radial opening 11 all of which are equally spaced on the periphery of the collar.

Tripping pins 12 have their inner ends screw threaded into the pockets 10 while a locking tripping pin 13 is screw threaded into the opening 11 so that its inner end will bind on the periphery of the sleeve and lock the collar against rotation. The pin 13 has a wrench receiving portion 14 so that a tool may be applied thereto and the pin tightened or loosened. It is understood that the pin 13 has the same radial projection from the collar as the other pins and performs the same office as the other pins.

A tripping lever 15 is pivoted intermediate on a bracket 16 depending from the frame 1. A horizontal yoke 17 has its rear ends secured to the sides of the chute 5 and extends forward, as is shown in Fig. 1. The forward end of the yoke is supported by a pair of bars 18 depending from the frame and is reduced to receive a pulley 19. A flexible connection 20 extends down from the inner end of the lever, under the pulley and to a point of connection with a valve 21 disposed in the chute 5. The valve 21 lies across the chute at an incline and is so held by a flat spring 22 bearing against its underside. The connection 20 includes in its length a coiled spring 23.

It is obvious that when the outer end of the lever 15 which projects into the path of the pins is depressed the inner end of said lever is swung upward. The swinging of the lever pulls the connection 20 whereby the valve 21 is opened and the seed which is previously lodged against said valve is thus permitted to drop. The spring 23 adds resiliency to the flexible connection and affords an easy operation.

In the drawings I have shown the formation had when eight pins are used. This will cause the lever 15 to be tripped eight times during each revolution of the wheel 3 and thus drop the seeds at a certain distance according to the diameter of the wheel. By adding a pin between each of the pins shown the frequency of the dropping operation is increased and the seeds are planted closer together; on the other hand by removing four of the pins alternately the frequency of the dropping operation is decreased and the seed planted farther apart. It is obvious that the pins may be disposed to drop the seeds in accordance with the desires of the planter. When the end of the row is reached and the planter is turned back on the next row it is necessary to adjust the collar 9 so that the pins will trip the valve 21 at the proper point to aline with the drop of the preceding rows. This is quickly accomplished by loosening the pin 13 and rotating the collar 9 to the proper space, after which the set pin is tightened and the collar locked. This is a very simple and satisfactory arrangement and obviates the use of a set screw.

What I claim is,

1. In a tripping device for planters, a sleeve constructed to be fastened on the ground wheel of a planter, a collar rotatably confined on the sleeve and having radial openings one of which extends inward to the sleeve, and a plurality of pins mounted in the opening, one of said pins being fitted in the opening extending to the sleeve and binding against said sleeve whereby the collar is fastened against rotation, said last named pin constituting a locking device which may be loosened to adjust the collar circumferentially of the sleeve.

2. In a checking attachment for planters, a seed chute valve, a supporting structure carrying a pulley, a tripping lever, a support for the tripping lever, a flexible connection extending from the tripping lever over the pulley to the valve, and a tripping device including a sleeve on which a plurality of radial pins are supported, and means for adjusting the pins circumferentially of the sleeve and fastening the same in position.

In testimony whereof I affix my signature.

WILLIAM L. SPROWL.

Copies of this patent may be obtained for five cents each, by addressing the "Commissioner of Patents, Washington, D. C."